US011808397B2

(12) United States Patent
Moon

(10) Patent No.: US 11,808,397 B2
(45) Date of Patent: Nov. 7, 2023

(54) PIPE ASSEMBLY INCLUDING AN ANCHOR MEMBER FOR RESISTING DELAMINATION OF A LINER FROM A PIPE SHELL

(71) Applicant: SYNCRUDE CANADA LTD. in trust for the owners of the Syncrude Project as such owners exist now and in the future, Calgary (CA)

(72) Inventor: Soon Won Moon, Edmonton (CA)

(73) Assignee: Syncrude Canada Ltd. in trust for the owners of the Syncrude Project as such owners exist now and in the future, Calgary (CA)

(*) Notice: Subject to any disclaimer, the term of this patent is extended or adjusted under 35 U.S.C. 154(b) by 16 days.

(21) Appl. No.: 17/591,235

(22) Filed: Feb. 2, 2022

(65) Prior Publication Data
US 2022/0243857 A1 Aug. 4, 2022

Related U.S. Application Data

(60) Provisional application No. 63/145,046, filed on Feb. 3, 2021.

(51) Int. Cl.
*F16L 57/06* (2006.01)
*F16L 9/14* (2006.01)

(52) U.S. Cl.
CPC .............. *F16L 57/06* (2013.01); *F16L 9/14* (2013.01)

(58) Field of Classification Search
CPC .......... F16L 57/06; F16L 9/14; B29C 37/0082
USPC ............... 138/147, 145, 172, 174, 175, 149; 266/285
See application file for complete search history.

(56) References Cited

U.S. PATENT DOCUMENTS

| 928,233 | A | * | 7/1909 | Langford | F16L 21/005 |
| | | | | | 138/147 |
| 2,086,525 | A | * | 7/1937 | Akers | C04B 28/32 |
| | | | | | 106/688 |
| 2,362,571 | A | * | 11/1944 | McCollum | B64D 13/08 |
| | | | | | 126/118 |
| 2,416,490 | A | * | 2/1947 | Molique | B01J 8/008 |
| | | | | | 52/249 |
| 4,061,162 | A | * | 12/1977 | Jones | F16L 59/147 |
| | | | | | 138/147 |
| 4,363,504 | A | * | 12/1982 | De Feo | F16L 59/21 |
| | | | | | 285/133.11 |
| 4,522,432 | A | | 6/1985 | Press | |
| 5,078,182 | A | * | 1/1992 | Kraft | F16L 59/21 |
| | | | | | 138/147 |
| 2005/0276945 | A1 | | 12/2005 | Muggli et al. | |

FOREIGN PATENT DOCUMENTS

CN 1225617 11/2005

* cited by examiner

*Primary Examiner* — Patrick F Brinson
(74) *Attorney, Agent, or Firm* — Knobbe, Martens, Olson & Bear, LLP

(57) ABSTRACT

A pipe assembly includes a pipe shell, a liner, and one or more anchor members. The pipe shell defines an inner wall. The liner lines the inner wall of the pipe shell and defines an inner wall of the pipe assembly. The anchor member is attached to the pipe shell, extends from the inner wall of the pipe shell, and is embedded within the liner. The anchor member may help to resist localized delamination of the liner from the pipe shell, and propagation of any localized delamination of the liner from the pipe shell. A related method is also provided for forming the pipe assembly.

38 Claims, 14 Drawing Sheets

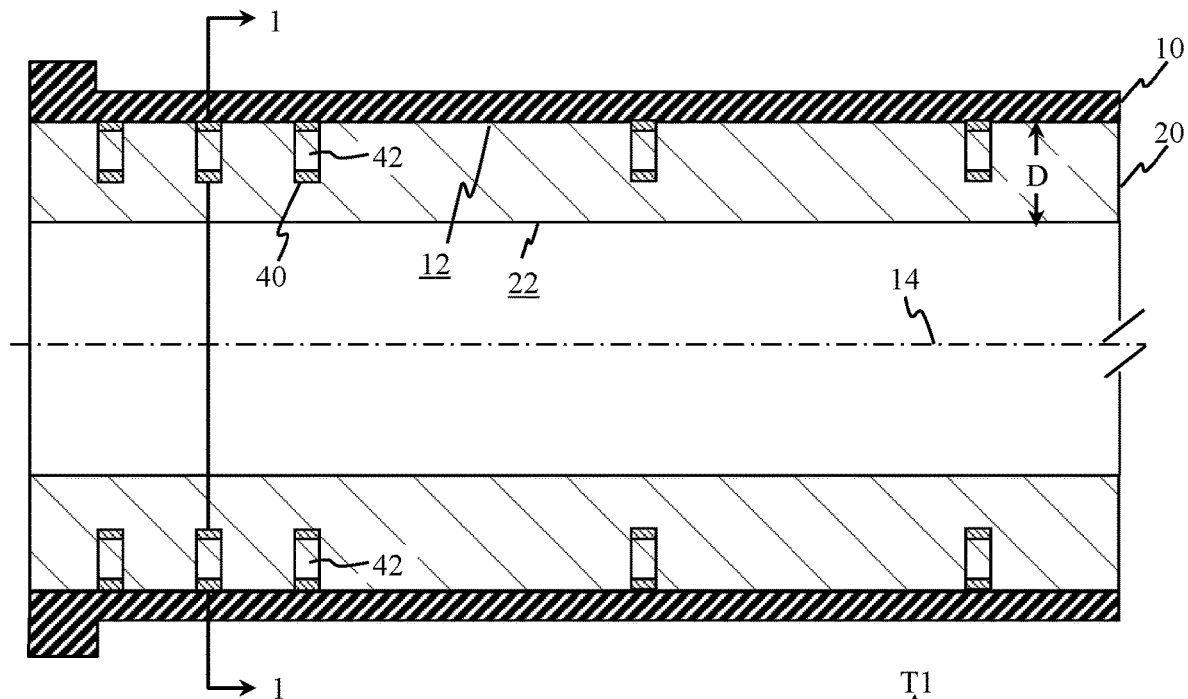
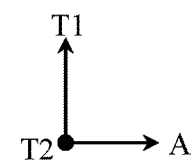
FIG. 4
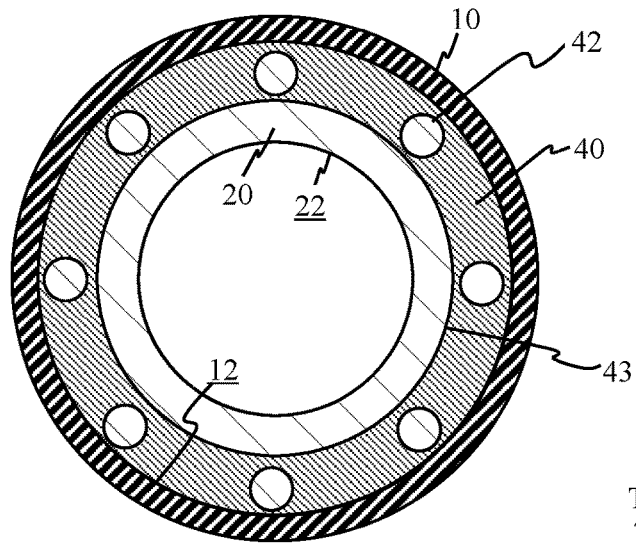
FIG. 5
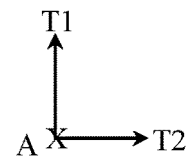

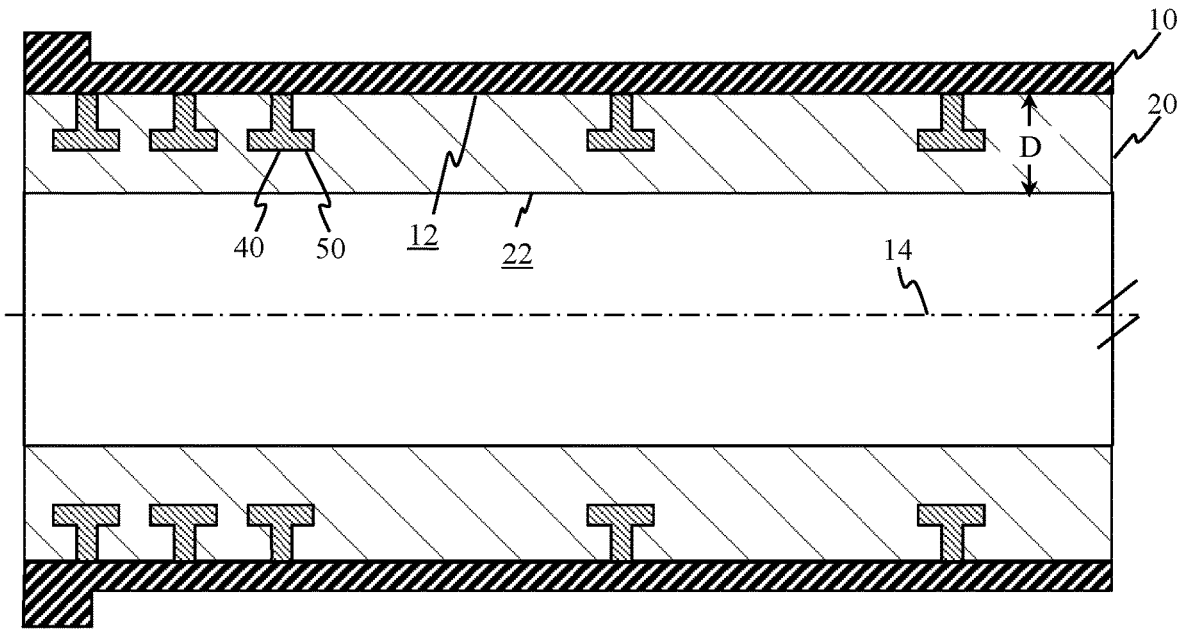
FIG. 9
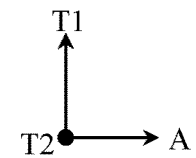
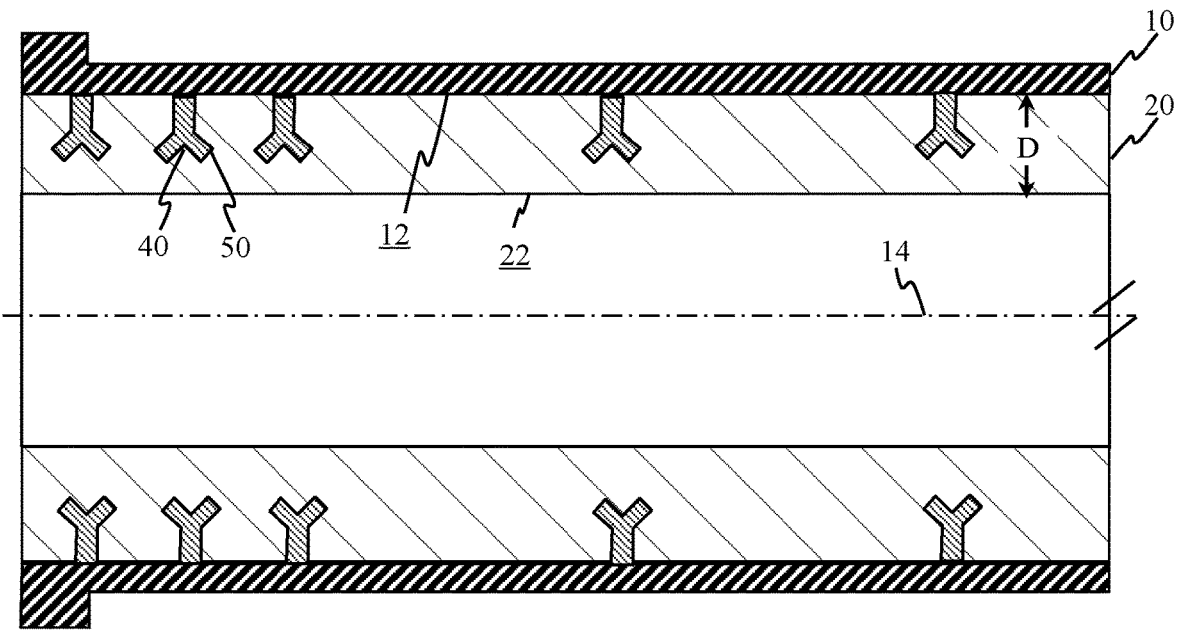
FIG. 10
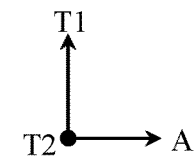

PIPE ASSEMBLY INCLUDING AN ANCHOR MEMBER FOR RESISTING DELAMINATION OF A LINER FROM A PIPE SHELL

CROSS-REFERENCE TO RELATED APPLICATION

This application claims priority to U.S. provisional application No. 63/145,046 filed on Feb. 3, 2021, the entire contents of which are incorporated by reference herein.

FIELD OF THE INVENTION

The invention relates to a pipe assembly including a pipe shell with an internal liner, and a related method for forming the pipe assembly.

BACKGROUND OF THE INVENTION

The inner wall of a steel pipe shell is vulnerable to scouring by abrasive solids (e.g., sand particles in an oil sands slurry), particularly at locations of accelerated fluid flow, such as inlets, outlets, flanges, tees, and elbows of a pipe spool.

The inner wall of the pipe shell may be protected with a liner. The liner may be applied to the inner wall of the pipe shell in uncured form (e.g., casting of fluid polyurethane or application of uncured "green" rubber sheets), and allowed to cure and bond thereto. The liner may also be applied by adhering cured sheets to the inner wall of the pipe shell.

Parts of the liner may delaminate from the inner wall of the pipe shell. Localized delamination (e.g., blistering) may not directly impact operation of the lined pipeline. However, when it propagates into large areas, it may bring high risks of premature spool failures. Adhesion deteriorates over time and the resultant propagation of the delamination can be a slow process in this case. However, catastrophic delamination can occur when the bonding interface between the liner and the pipe shell is exposed to the pressurized process stream. In combination with deterioration in adhesion, the pressurized process stream may travel a long distance along the bonding interface once it finds the bonding interface. Due to mismatch in internal diameter at pipe connections, the pipe inlet has been identified as a high wear location, and in many cases, catastrophic delamination has been observed starting from there. Larger areas of the delaminated liner may separate from the rest of the liner, plug pumps, and cause other operational problems.

Accordingly, there remains a need in the art to prevent delamination of the liner from the pipe shell, or at least limit propagation of localized delamination of the liner.

SUMMARY OF THE INVENTION

In one aspect, the present invention comprises a pipe assembly defining an axial direction parallel to a central axis of the pipe assembly, and a transverse direction perpendicular to the axial direction. The pipe assembly comprises: a pipe shell defining an inner wall; a liner that lines the inner wall of the pipe shell, and defines an inner wall of the pipe assembly; and at least one anchor member that is attached to the pipe shell, extends from the inner wall of the pipe shell, and is embedded within the liner.

In embodiments, the at least one anchor member comprises a plurality of anchor members. In embodiments, the anchor members are spaced apart from each other in the axial direction. In embodiments, the anchor members are spaced apart circumferentially from each other in a transverse cross-section of the pipe assembly perpendicular to a central axis of the pipe assembly, so as to extend from different portions of the inner wall of the pipe shell in the transverse cross-section of the pipe assembly.

In embodiments, the anchor member may define at least one aperture filled by the liner, and through which the liner extends. The aperture may have a shape that narrows in width, proceeding in a direction from the inner wall of the pipe shell toward the central axis of the pipe assembly.

In embodiments, the anchor member comprises a plate. The plate can be an annular plate having an annular shape in a transverse cross-section of the pipe assembly perpendicular to a central axis of the pipe assembly. The at least one anchor member can be multiple non-annular plates which are spaced apart circumferentially from each other in a transverse cross-section perpendicular of the pipe assembly to a central axis of the pipe assembly, so as to extend from different portions of the inner wall of the pipe shell in a transverse-cross-section of the pipe assembly. In embodiments, the plate or plates define a planar surface that is perpendicular to the axial direction.

In embodiments, the anchor member plate defines at least one aperture that is filled by the liner, and through which the liner extends in the axial direction, as described above. In embodiments where the plate has the annular shape in the transverse cross-section, it will be understood that the aperture is additional to the central aperture defined by the arcuate body of the annular plate, and which is only partially occupied, but not completely filled, by the liner.

In embodiments, the anchor member plate further comprises at least one protrusion extending axially from the annular plate. In embodiments, the anchor plate has a T-shape or a Y-shape in an axial cross-section.

In embodiments, the anchor member comprises at least one bar. In embodiments, bar has protrusions such as a T-shaped or Y-shaped cross-section. In embodiments, the bar has more than one point of attachment to the pipe shell. In embodiments, the bar defines at least one aperture through which the liner extends, as described above. In embodiments, bar extends from a first end attached to the pipe shell to a second end attached to a cap that extends away from the bar in multiple directions. In embodiments, the bar and the cap may be formed monolithically with each other. In embodiments, the bar and the cap may be formed separately from each other, and then attached to each other, such as by welded connection, or removably attached to each other, such as by threaded connection. The cap may define the at least one aperture filled by the liner, and through which the liner extends, as described above.

In embodiments, the pipe assembly further comprises at least one reinforcing member attached to the anchor member (whether in the form of a plate, a bar, or otherwise), spaced apart from the inner wall of the pipe shell, and embedded in the liner. In embodiments, the reinforcing member comprises a wire mesh.

Without restriction to a theory, the anchor member may help to resist localized delamination of the liner from the pipe shell, by increasing the bonded surface area of the liner, and by providing a surface that is normal to or having a component normal to the transverse direction, against which the liner may bear.

Without restriction to a theory, the anchor member may help to resist propagation of localized delamination of the liner, by increasing the tortuosity of the bonding interface of the liner and the inner wall of the pipe shell, and hence interfering with fluid flow along the bonding interface that may tend to advance propagation of the localized delamination of the liner.

In another aspect, the present invention comprises a method of forming a pipe assembly. The method comprises the steps of: (a) providing at least one anchor member attached to and extending from an inner wall of a pipe shell; and (b) applying a liner material to the inner wall of the pipe shell to form a liner that lines the inner wall of the pipe shell, and defines an inner wall of the pipe assembly, with the at least one anchor embedded within the liner.

In embodiments, step (a) may comprise attaching the at least one anchor member to the inner wall of the pipe shell by welding, a fastener, or an adhesive, or may comprise forming the at least one anchor member monolithically with the pipe shell by casting.

In embodiments, step (b) comprises applying the liner material in liquid or malleable form and allowing the liner material to cure in place. In embodiments, the at least one anchor member defines an aperture, and the liner material in liquid or malleable form fills the aperture before being allowed to cure in place.

In embodiments, the method further comprises before step (b), the step of providing at least one reinforcing member attached to the anchor member, spaced apart from the inner wall of the pipe shell. After step (b) the at least one reinforcing member is embedded in the liner. In embodiments, the at least one reinforcing member may comprise a wire mesh.

BRIEF DESCRIPTION OF THE DRAWINGS

In the drawings, like elements may be assigned like reference numerals. The drawings are not necessarily to scale, with the emphasis instead placed upon the principles of the present invention. Additionally, each of the embodiments depicted are but one of a number of possible arrangements utilizing the fundamental concepts of the present invention.

FIG. 4 is an axial cross-sectional view of a portion of a second embodiment of a pipe assembly of the present invention, including anchor members in the form of annular plates, each of which defines apertures filled by the liner, and through which the liner extends.

FIG. 5 is a transverse cross-sectional view along line 1-1 of FIG. 4 showing a variant of the annular plate with elliptical (circular) apertures.

FIG. 9 is an axial cross-sectional view of a third embodiment of a pipe assembly of the present invention, including an anchor member having a T-shaped axial cross-section, formed by an annular plate with a pair of axially extending protrusions.

FIG. 10 is an axial cross-sectional view of a variant of the pipe assembly of FIG. 9, including an anchor member having a Y-shaped axial cross-section, formed by an annular plate with a pair of axially and transversely extending protrusions.

DETAILED DESCRIPTION OF EMBODIMENTS OF THE INVENTION

The invention relates to a pipe assembly including a pipe shell with an internal liner. Any term or expression not expressly defined herein shall have its commonly accepted definition understood by a person skilled in the art.

Prior Art Pipe Assembly.

Figure 1:
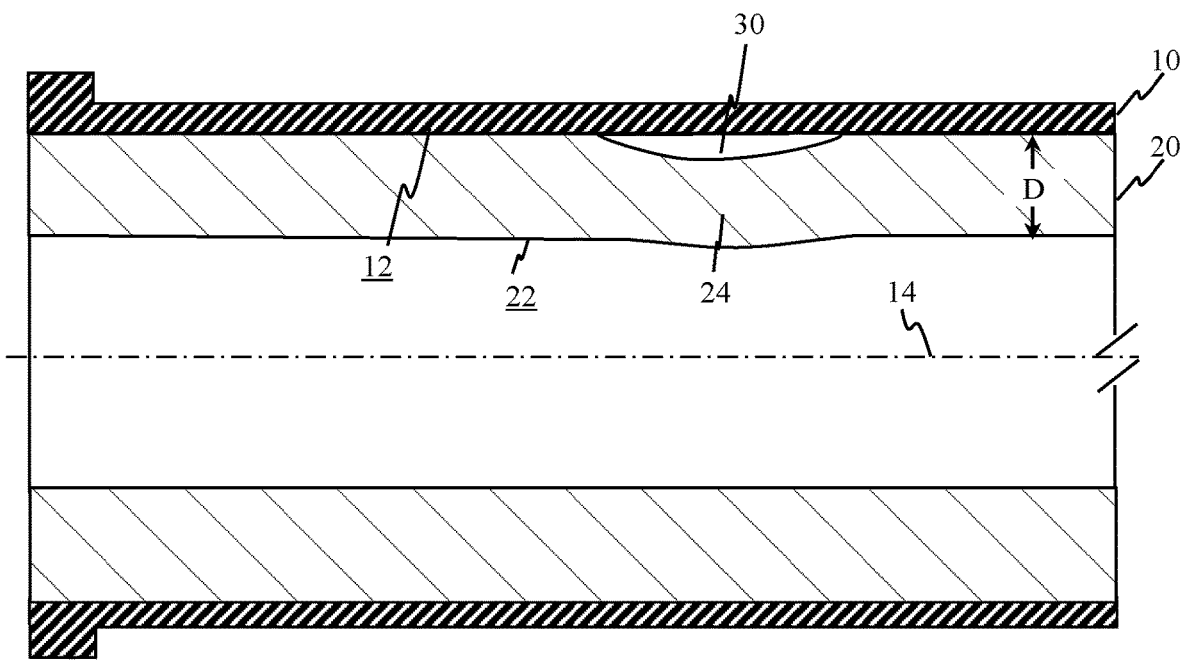
FIG. 1 is an axial cross-sectional view of a portion of a conventional pipe assembly, exhibiting localized delamination of the liner from the pipe shell.
Figure 1:
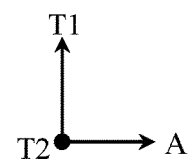

FIG. 1 shows an axial cross-sectional view of a conventional pipe assembly including a cylindrical pipe shell (10) and an internal liner (20) that lines the inner wall (12) of the pipe shell (10), and defines an inner wall (22) of the pipe assembly.

"Axial", as used herein, refers to the direction parallel to the elongate central axis (14) of the pipe assembly. "Transverse", as used herein, refers to a direction that is perpendicular to the axial direction. In FIG. 1, for example, the axis "A" denotes the axial direction, while the axes "T1" and "T2" (which is perpendicular to the drawing plane) denote transverse directions. This axis labelling convention is used throughout the Figures.

The pipe shell (10) may be straight as shown in FIG. 1, or non-straight (e.g., tee, or elbow). The pipe shell (10) may be made of carbon steel, or other material. The liner (20) may be made of an elastomer (e.g., polyurethane, or rubber), or other material. The liner (20) defines a "transverse thickness", which refers to the thickness (D) of the liner (20) as measured from the inner wall (12) of the pipe shell (10) to the inner wall (22) of the pipe assembly, which is defined by the exposed surface of the liner (20).

FIG. 1 shows a portion (24) of the liner (20) that has delaminated from the pipe shell (10). The bonding interface between the inner wall (12) and the liner (20) may deteriorate over time, be compromised by localized wear of the liner (20), or be suboptimal because of manufacturing or installation defects. Whatever the reason, once the bonding interface has been compromised and fluid (30) (e.g., liquid or steam) enters the bonding interface between the inner wall (12) and the liner (20), the liner (20) is pushed away from the inner wall (12). As the fluid flows along the bonding interface, the fluid pressure can propagate the localized delamination in both axial and transverse directions.

Pipe Assembly of the Present Invention.

The improved pipe assembly of the present invention has one or more anchor members (40). The anchor members (40) may be of one or a combination of embodiments, as described below. Each of the anchor members (40) is attached to the pipe shell (10), and extends transversely from the inner wall (12) of the pipe shell (10), so as to be embedded within the liner (20). The expression "extends transversely", as used in this context, refers to the anchor member (40) extending from the inner wall (12) at a non-zero angle, and as such, does not require the anchor member (40) to extend perpendicularly from the inner wall (12) of the pipe shell (10). The expression "embedded", as used in this context means that the outer surface of the anchor member (40) is encased by and in contact with the liner (20).

The present invention is not limited by the anchor member (40) being made of any particular material. As a non-limiting example, the anchor member (40) may be made of steel, so as to permit welding of the anchor member (40) to the pipe shell (10) if also made of steel.

In embodiments, the outer surface of the anchor member (40) may be formed, prepared, or treated to enhance adhesion between the anchor member (40) and the liner (20). As a non-limiting example, a primer or adhesive coating may be applied to the outer surface of the anchor member (40). As another non-limiting example, the anchor member (40) may be formed or prepared so that it has a surface roughness or a "key" for better adhesion with the liner (20).

The present invention is not limited by any particular manner of attachment of the anchor member (40) to the pipe shell (10), as long as the attachment fixes the anchor member (40) to the pipe shell (10). In embodiments, the anchor member (40) may be welded to the pipe shell (10). In other embodiments, the anchor member (40) may be attached to the pipe shell (10) by fasteners (e.g., bolts), or by a cured adhesive. In other embodiments, the anchor member (40) may be formed monolithically with the pipe shell (10) (e.g., by a molding, or a casting process).

In embodiments, one purpose of the anchor member (40) may be to better secure the liner (20) to the pipe shell (10), and thereby resist delamination of the liner (20) from the pipe shell (10). In embodiments, this may be attributable to the anchor member (40) increasing the bonded surface area of the liner (20). In embodiments, this may be attributable to the anchor member (40) providing a surface that is normal to or having a component normal to the transverse direction, against which the liner (20) may bear.

In embodiments, another purpose of the anchor member (40) may be to resist propagation of localized delamination of the liner (20). In embodiments, this may be attributable to the presence of the anchor member (40) increasing the tortuosity of the bonding interface of the liner (20) and the inner wall (12) of the pipe shell (10), and hence interfering with fluid flow along the bonding interface.

Embodiments of the pipe assembly are now described.

First Embodiment: Anchor Member in Form of an Annular Plate

Figure 2:
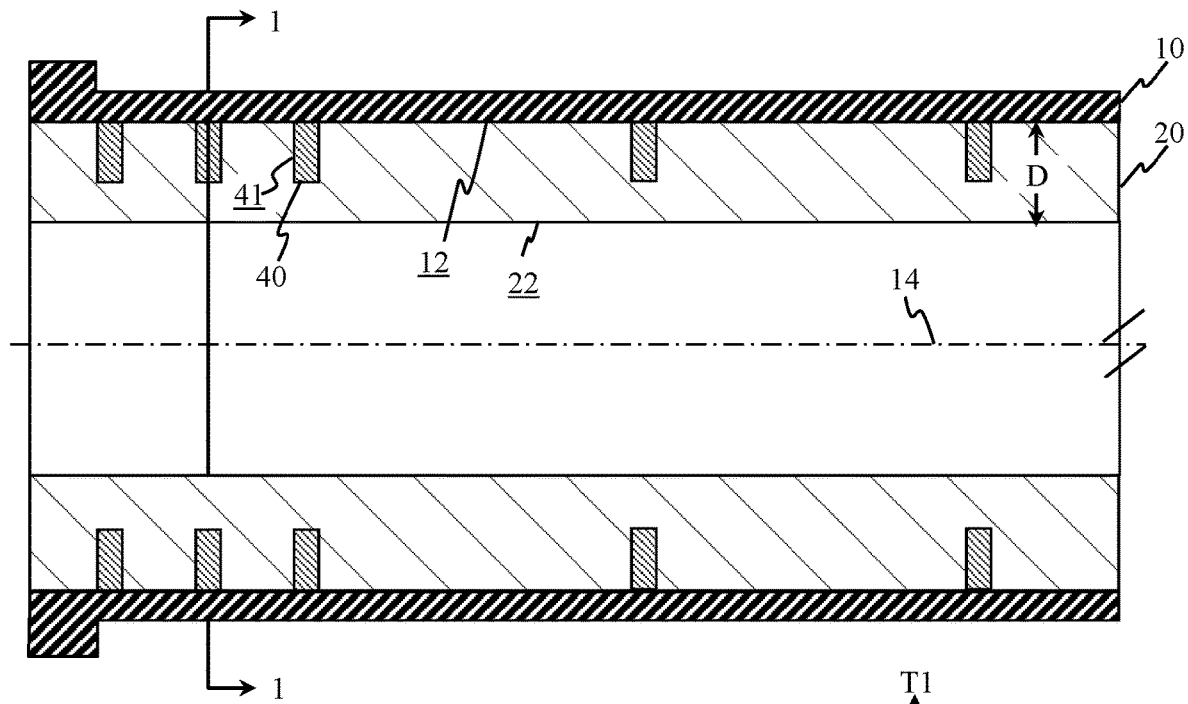
FIG. 2 is an axial cross-sectional view of a portion of a first embodiment of a pipe assembly of the present invention, including anchor members in the form of annular plates.
Figure 2:
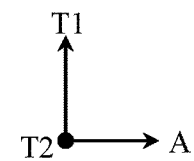
Figure 3:
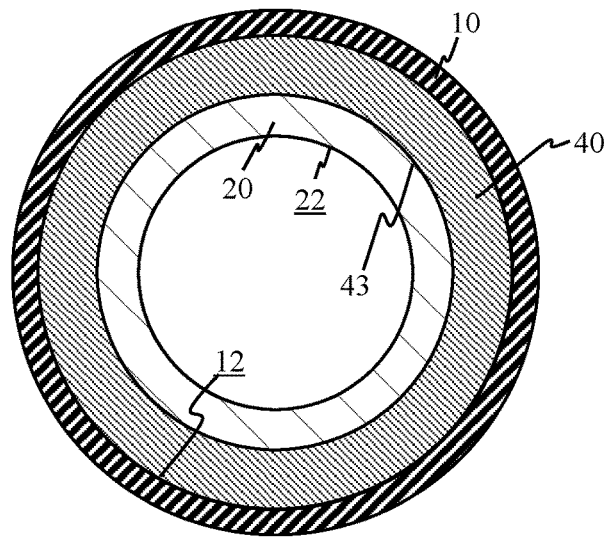
FIG. 3 is a transverse cross-sectional view along line 1-1 of FIG. 2.
Figure 3:
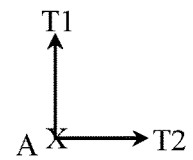

FIGS. 2 and 3 show an axial cross-sectional view, and a transverse cross-sectional view, respectively, of an embodiment of a pipe assembly of the present invention including a plurality of axially spaced apart anchor members (40) in the form of an annular plate having annular shape in a transverse cross-section.

The present invention is not limited by any number of anchor members (40) or any particular axial spacing between the anchor members (40). In this embodiment, the axial spacing between the anchor members (40) is reduced in the vicinity of the inlet, where delamination of the liner (20) may expected to be more problematic.

The present invention is not limited by any particular degree to which the anchor member (40) extends into the transverse thickness (D) of the liner (20). However, it may be expected that the efficacy of the anchor member (40) in resisting delamination of the liner (20) may increase, at least to an extent, with an increase in the depth to which the anchor member (40) extends into the transverse thickness (D) of the liner (20).

In this embodiment, the annular plate defines planar surfaces (41) that are at about 90° to the axial direction (A). In other embodiments, the angle between the planar surfaces (41) and the axial direction (A) may be a non-zero angle that different from 90°, e.g. in the range of 45° to 90°.

In this embodiment, the annular plate of the anchor member (40) is formed by a single monolithic piece. In other embodiments, the annular plate may be formed by two or more separate arcuate pieces, in order to facilitate installation of the anchor member (40) in the pipe shell (10).

Second Embodiment: Anchor Member in Form of a Plate Defining Apertures Filled with the Liner and Through which the Liner Extends FIG. 4 shows an axial cross-sectional view of a second embodiment of a pipe assembly of the present invention. The pipe assembly is in all respects analogous to the first embodiment shown in FIGS. 2 and 3, except that the anchor member (40) defines one or more apertures (42) that is filled by the liner (20) and through which the liner (20) axially extends. It will be understood that the apertures (42) refers to an aperture formed in the arcuate body of the annular plate, that is distinct form the main central aperture (43) that is also defined by the arcuate body of the annular plate and partially occupied by, but not completely filled by, the liner (20).

During the lining process, liner material may penetrate into the apertures (42) and then cure in place within the apertures (42). For example, liner material in the form of liquid polyurethane may flow readily into the apertures (42), and then cure in place. In another example, "green" (i.e., uncured) liner material such as rubber may be sufficiently soft, malleable, and flowing under pressure to work into the apertures (42), and then cure in place. The liner (20) filling the apertures (42) may enhance the efficacy of the anchor member (40) in preventing delamination of the liner (20) from the inner wall (12) of the pipe shell (10) by increasing the available bonded surface area of the liner (20), and by providing surfaces against which the liner (20) can bear to resist separation of the liner (20) from the pipe shell (10).

Figure 6:
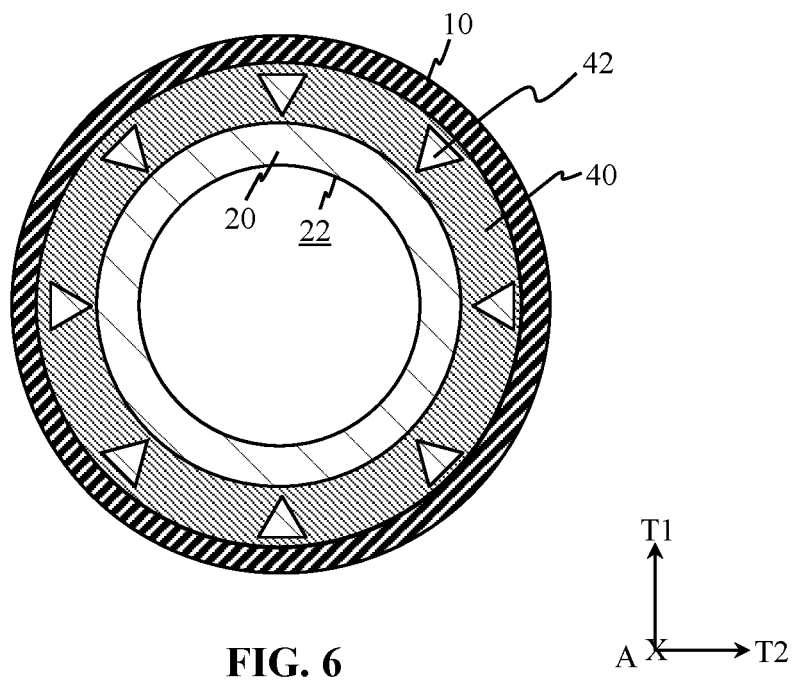
FIG. 6 is a transverse cross-sectional view along line 1-1 of FIG. 4 showing a variant of the annular plate with triangular apertures.
Figure 7:
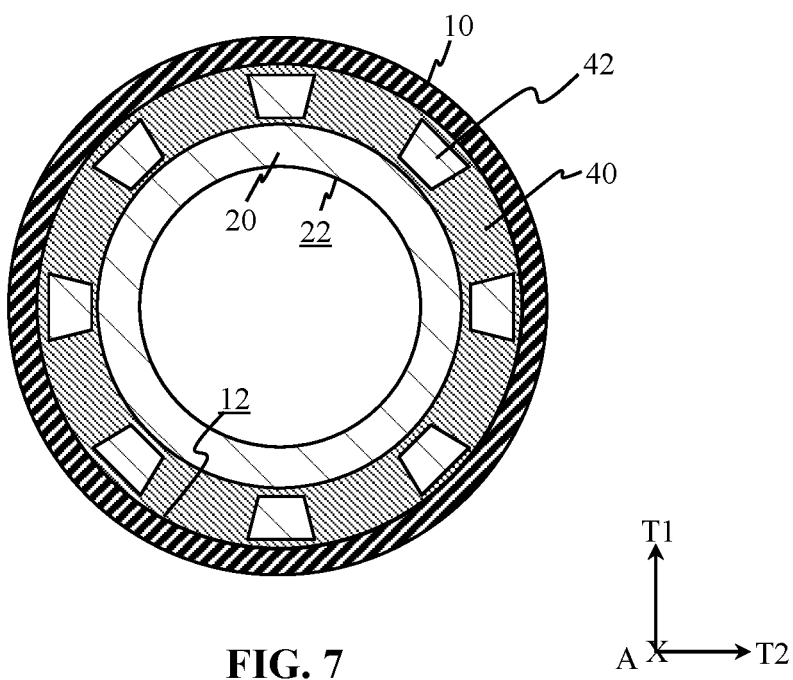
FIG. 7 is a transverse cross-sectional view along line 1-1 of FIG. 4 showing a variant of the annular plate with quadrilateral (trapezoidal) apertures.

The present invention is not limited by any particular number or shape of the apertures (42), or position of the apertures (42) on the anchor member (40). As a non-limiting example, in the embodiment shown in FIG. 5, the anchor member defines eight, equally spaced-apart elliptical (circular) apertures (42) in an annular plate. As further non-limiting examples, FIGS. 6 to 8 show variations of the anchor member (40), having apertures (42) that are triangular (FIG. 6), quadrilateral, and more particularly trapezoidal (FIG. 7), or arcuate (FIG. 8).

Figure 8:
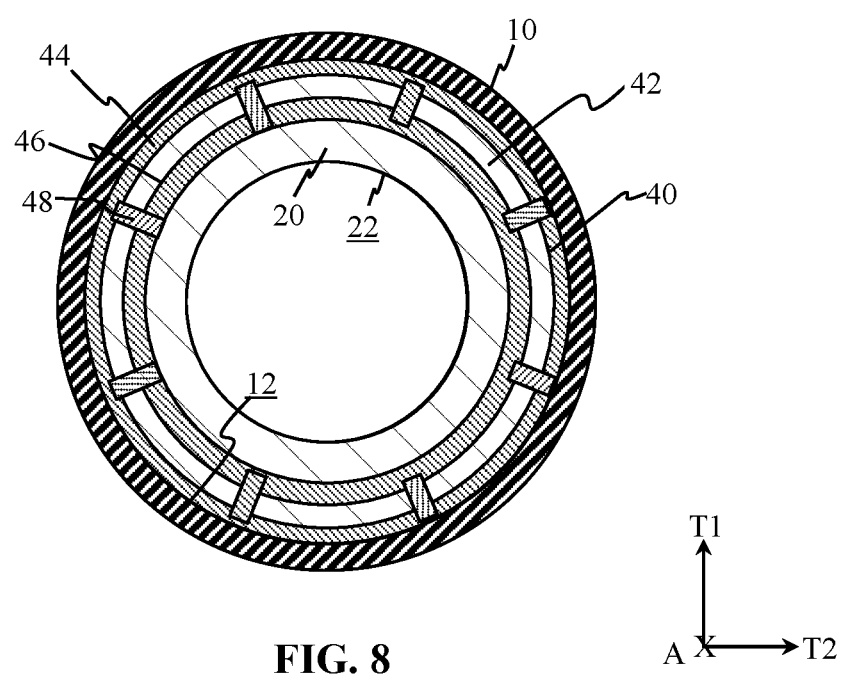
FIG. 8 is a transverse cross-sectional view along line 1-1 of FIG. 4 showing a variant of the annular plate with arcuate apertures.

It may be advantageous for the shape of the apertures (42) to have a width that decreases in the transverse direction from the inner wall (12) of the pipe shell (10) toward the central axis (14) of the pipe shell (10), such as shown by the examples of the triangular apertures (42) (FIG. 6), the trapezoidal apertures (42) (FIG. 7), and the arcuate apertures (42) (FIG. 8). To explain, flow of fluid through the pipe assembly will wear the liner (20) in the transverse direction from the central axis (14) toward the inner wall (12) of the pipe shell (10). As wear proceeds, portions of the apertures (42) most proximal to the central axis will become exposed. The width of the exposed portions of the apertures (42) are narrower than the width of the remaining portions of the apertures (42), and will therefore interfere with delamination of those remaining portions of the liner (20).

The variant shown in FIG. 8 allows for the apertures (42) to be formed without punching, molding or casting the annular plate. Instead, the anchor member (40) may be formed by a concentric outer annular plate (44) and inner annular plate (46), joined by transversely extending spoke members (48), which may be welded or otherwise attached to the plates (44, 46).

Third Embodiment: Anchor Member in Form of an Annular Plate with Protrusions Extending Axially from the Annular Plate FIG. 9 shows an axial cross-sectional view of a third embodiment of a pipe assembly of the present invention. The pipe assembly is in all respects analogous to the first embodiment shown in FIGS. 2 and 3, except that anchor member (40) includes one or more protrusions (50) that extend axially from the annular plate. In this embodiment, two protrusions (50) extend axially in opposite directions from the inner edge of the annular plate, such that the annular plate has a T-shaped axial cross section.

FIG. 10 shows a pipe assembly that is in all respects analogous to the embodiment shown in FIG. 9, except that the two protrusions (50) extend both axially and transversely (i.e., in the direction (T1) shown in FIG. 1), such that the annular plate has a Y-shaped axial cross-section.

In other embodiments, the one or more protrusions (50) may extend axially from a portion of the annular plate other than its inner edge. For example, a protrusion (50) may extend axially from a midpoint height of one of the two transversely extending surfaces of the annular plate.

The axially-extending protrusions (50) may enhance the efficacy of the anchor member (40) in preventing delamination of the liner (20) from the inner wall (12) of the pipe shell (10). This may be by increasing the available bonded surface area of the liner (20), and by providing surfaces against which the liner (20) can bear to resist separation of the liner (20) from the pipe shell (10).

To further improve the efficacy of the anchor member (40) in form of an annular plate with protrusions (50), the annular plate may have one or more apertures (42) filled by the liner (20) and through which the liner (20) axially extends. In embodiments, the apertures (42) can be elliptical (circular) (as shown in FIG. 5), triangular (as shown in FIG. 6), quadrilateral, and more particularly trapezoidal (as shown in FIG. 7), or arcuate (as shown in FIG. 8).

Figure 11:
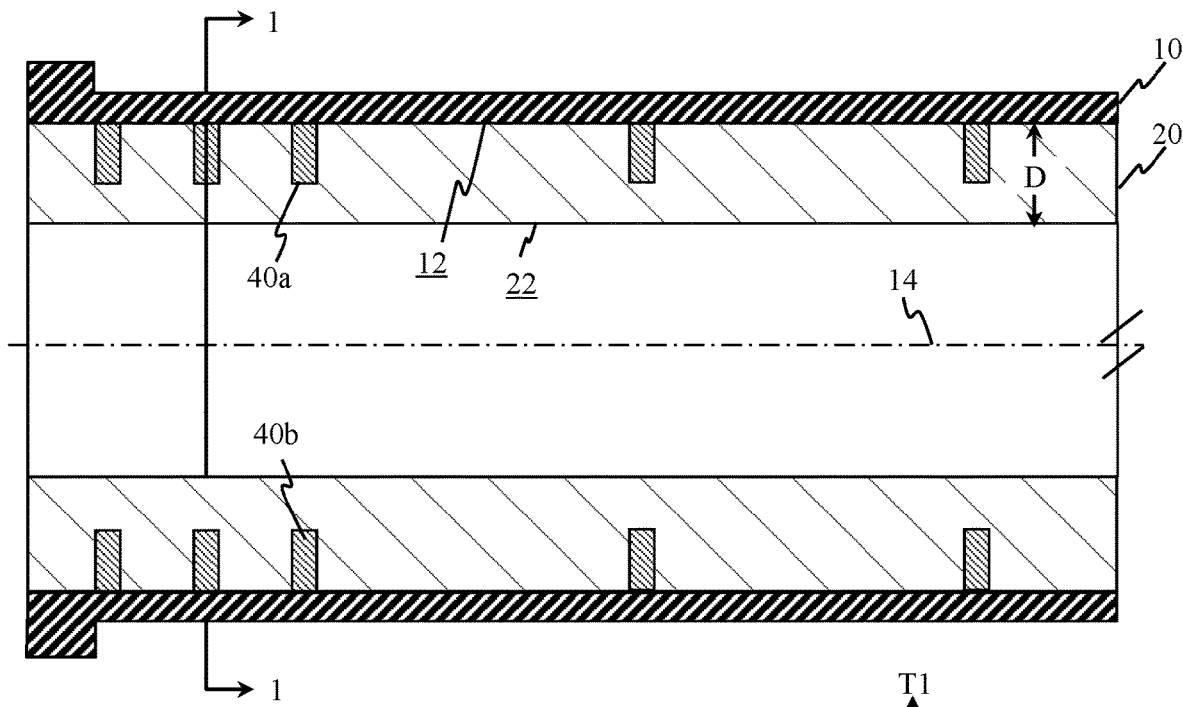
FIG. 11 is an axial cross-sectional view of a fourth embodiment of a pipe assembly of the present invention, including anchor members in the form of plates spaced circumferentially apart from each other.
Figure 12:
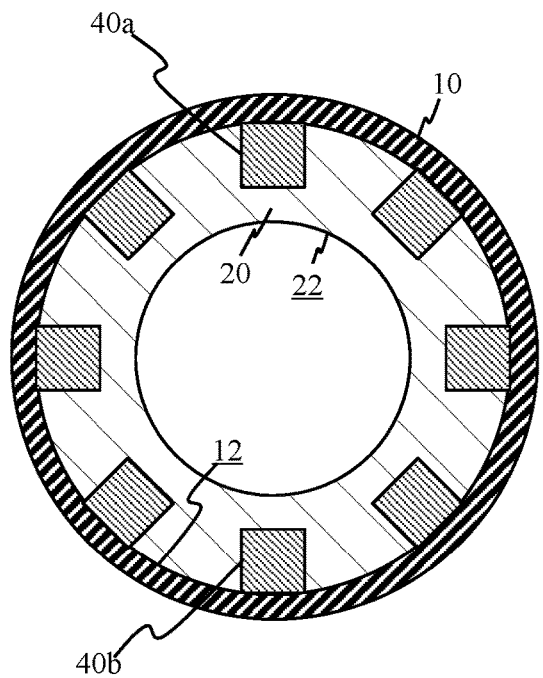
FIG. 12 is a transverse cross-sectional view along line 1-1 of FIG. 11.

Fourth Embodiment: Anchor Members in the Form of Multiple Plates Circumferentially Spaced Apart from Each Other FIGS. 11 and 12 show an axial cross-sectional view, and a transverse cross-sectional view, respectively, of a fourth embodiment of a pipe assembly of the present invention including a plurality of anchor members (40) in the form of multiple plates spaced apart circumferentially from each other in the transverse cross-sectional plane that is perpendicular to the central axis (14) of the pipe assembly. That is, in a transverse cross-section of the pipe assembly such as shown in FIG. 12, different plates (40a, 40b) extend from different portions of the inner wall (12) of the pipe shell (10). The present invention is not limited by any particular circumferential spacing between adjacent plates in the transverse cross-section. In a limiting case, the circumferential spacing may approach zero, in which case the multiple plates will approximate an annular plate (as shown in the embodiment of FIGS. 2 and 3), but made of discrete sections.

In the embodiment shown in FIGS. 11 and 12, each of the plates (40a, 40b) has a square shape in the transverse cross-section. In other embodiments, the plates may have different shapes. In other embodiments, each of the anchor members may further include one or more protrusions extending axially from the plates (40a, 40b) in a manner analogous to the protrusions (50) extending from the annular plates in the embodiments shown in FIGS. 9 and 10.

Fifth Embodiment: Anchor Members in the Form of Multiple Plates Circumferentially Spaced Apart from Each Other, and Defining Apertures Filled with the Liner and Through which the Liner Axially Extends FIGS. 13 and 14 show an axial cross-sectional view, and a transverse cross-sectional view, respectively, of a fifth embodiment of a pipe assembly of the present invention.

The pipe assembly is in all respects analogous to the first embodiment shown in FIGS. 11 and 12, except that anchor member defines one or more apertures (42a, 42b) that is filled by the liner (20) and through which the liner (20) axially extends. The apertures (42a, 42b) are analogous in purpose and function to the apertures (42) of the embodiments shown in FIGS. 4 to 8.

The present invention is not limited by any particular number or shape of the apertures (42), or position of the apertures (42) on the anchor member (40). As a non-limiting example, in the embodiment shown in FIG. 14, each anchor member (40) defines one elliptical (circular) apertures (42) in the plate. In further non-limiting examples, the apertures (42) may be triangular (as shown in FIG. 6), quadrilateral, and more particularly trapezoidal (as shown in FIG. 7), or arcuate (as shown in FIG. 8).

Figure 13:
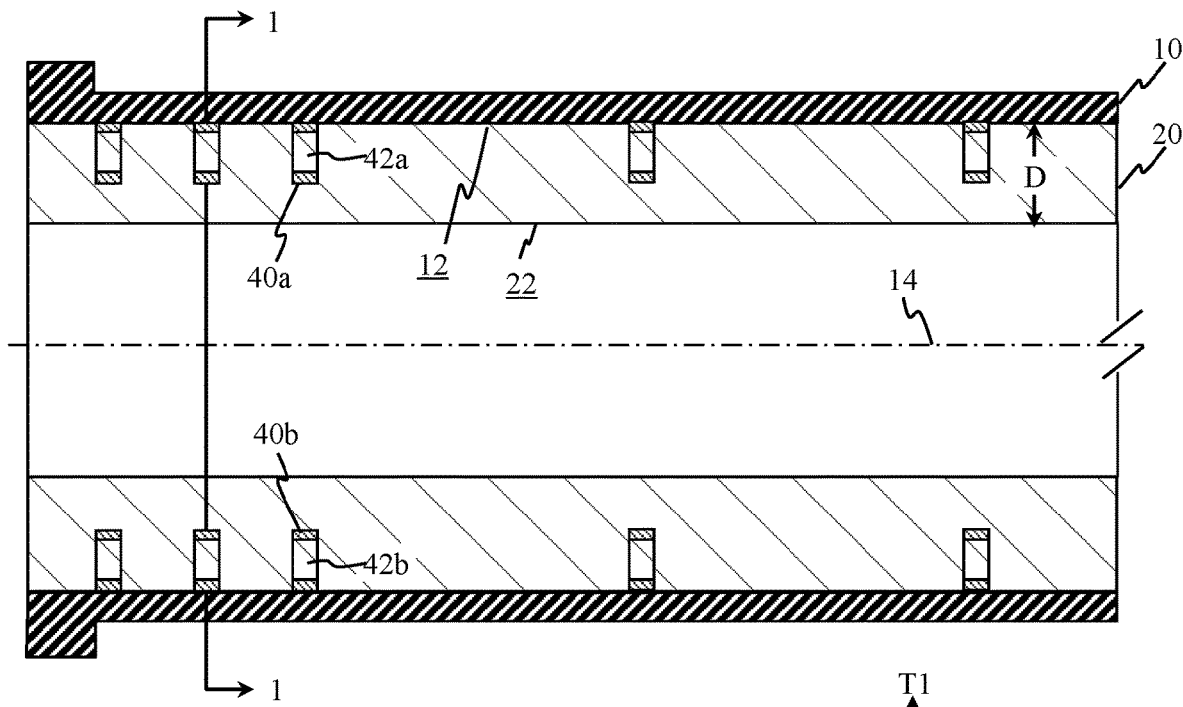
FIG. 13 is an axial cross-sectional view of a fifth embodiment of a pipe assembly of the present invention, including anchor members in the form of plates spaced circumferentially apart from each other, and defining apertures filled by the liner and through which the liner extends.
Figure 13:
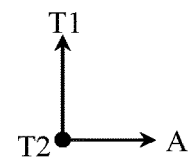
Figure 14:
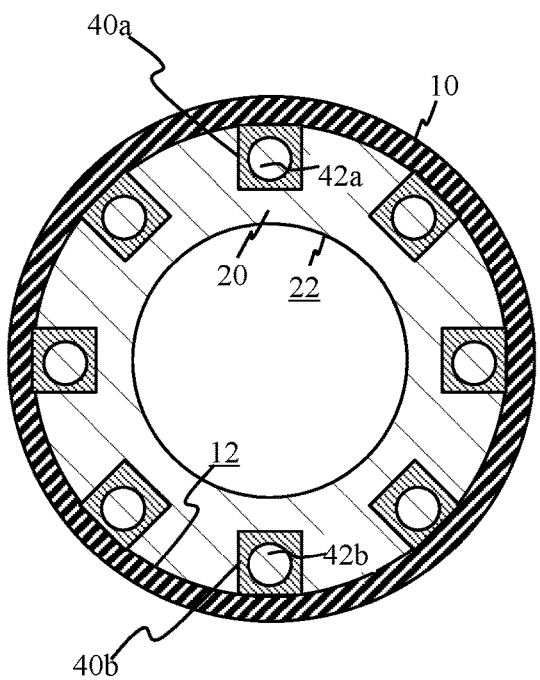
FIG. 14 is a transverse cross-sectional view along line 1-1 of FIG. 13.
Figure 14:
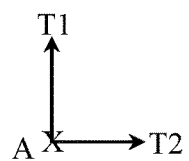

In the embodiment shown in FIGS. 13 and 14, each of the plates (40a, 40b) has a square shape. In other embodiments, the plates may have different shapes. In other embodiments, each of the anchor members may further include one or more protrusions extending axially from the plates (40a, 40b) in a manner analogous to the protrusions (50) extending from the annular plates in the embodiments shown in FIGS. 9 and 10.

Sixth Embodiment: Anchor Members in the Form of Bars

Figure 15:
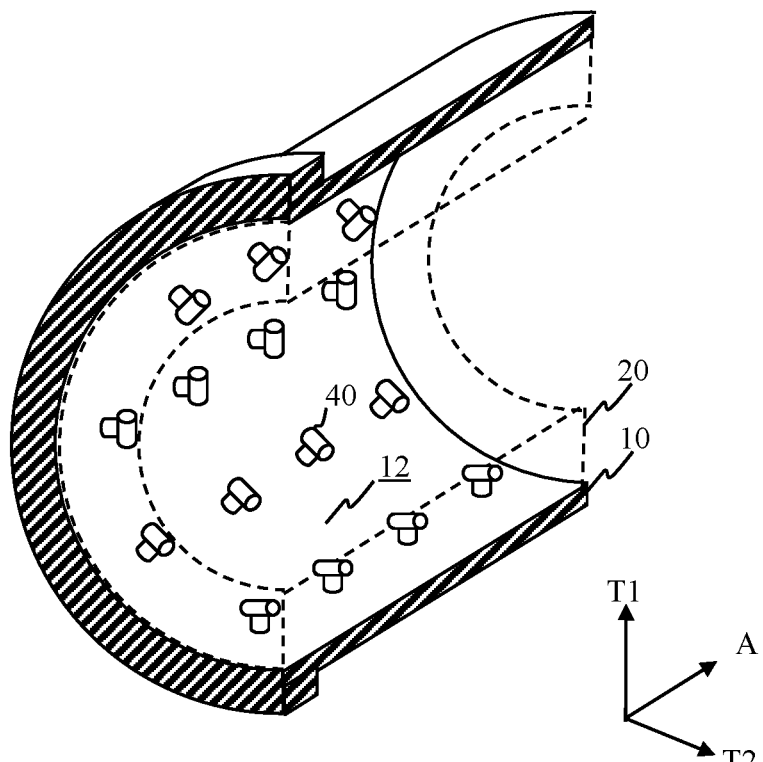
FIG. 15 is a perspective view along an axial section of a sixth embodiment of a pipe assembly of the present invention, including a plurality of spaced apart anchor members in the form of bars having a T-shaped cross-section. The liner (defined by dashed line) is shown as transparent to show the anchor members embedded in the liner.
Figure 16:
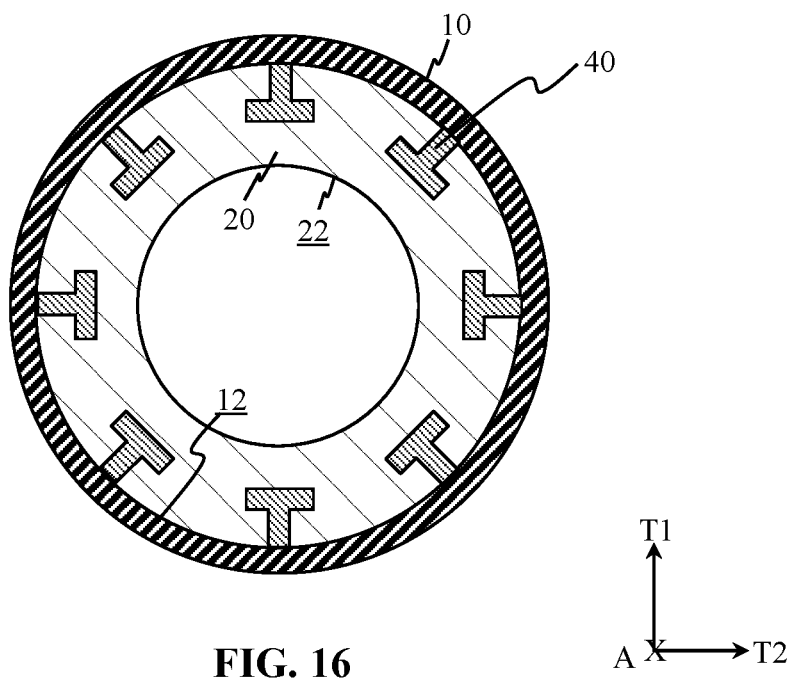
FIG. 16 is a transverse cross-sectional view of the pipe assembly of FIG. 15.

FIGS. 15 and 16 show a perspective view along an axial section, and a transverse cross-sectional view, respectively, of an embodiment of a pipe assembly of the present invention having a plurality of anchor members (40) in the form of bars that are distributed circumferentially and/or axially on the inner wall (12) of the pipe shell (10). The present invention is not limited by any number or distribution of the anchor members (40) along the inner wall (12) of the pipe shell (10). As a non-limiting example, in the embodiment shown in FIG. 15, the anchor members (40) may be distributed in circumferential rows aligned in a plane defined by the transverse axes (T1, T2). In other embodiments (not shown), the anchor members (40) may be distributed in a spiral configuration along the inner wall (12) of the pipe shell (10).

Figure 17:
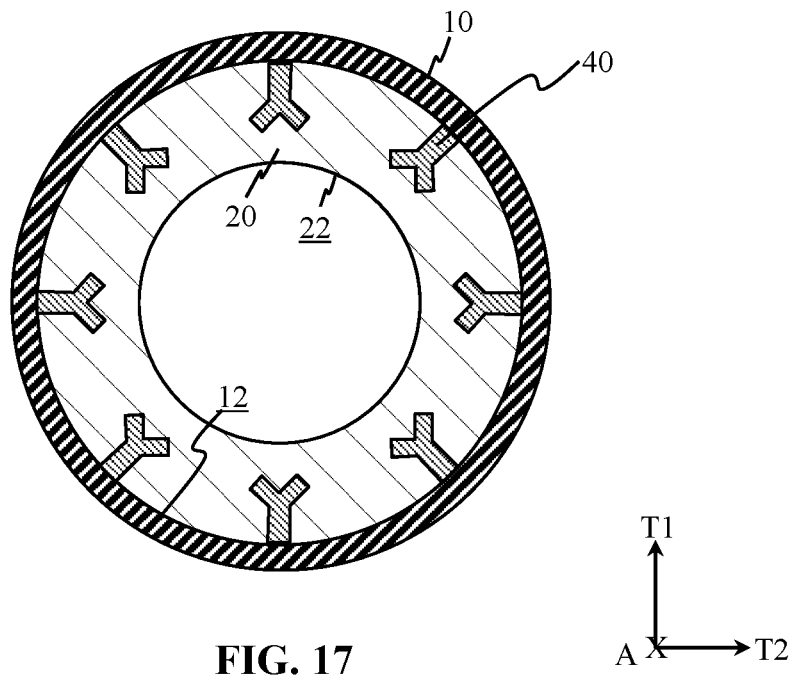
FIG. 17 is a transverse cross-sectional view of a variant of the pipe assembly of FIG. 15 with a plurality of anchor members having a Y-shaped cross-section.

In the embodiment shown in FIGS. 15 and 16, each of the anchor members (40) is the form of a bar with protrusions, having a T-shaped cross-section in the transverse plane perpendicular to the central axis of the pipe assembly. In the embodiment shown in FIG. 17, the bar may have a Y-shape cross section in the transverse plane perpendicular to the central axis of the pipe assembly.

Figure 18:
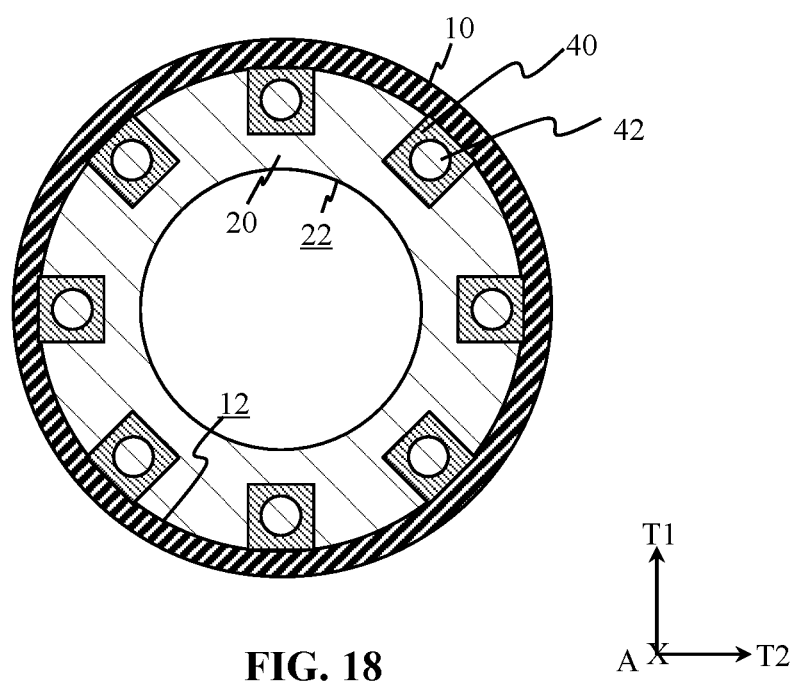
FIG. 18 is a transverse cross-sectional view of a variant of the pipe assembly of FIG. 15 with a plurality of anchor members, each defining an aperture filled by the liner and through which the liner extends.
Figure 19:
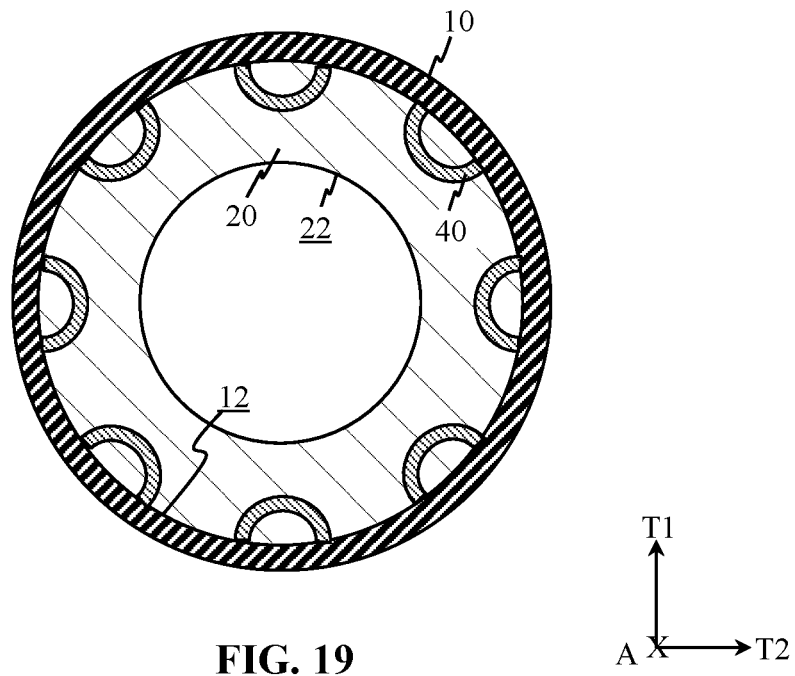
FIG. 19 is a transverse cross-sectional view of a variant of the pipe assembly of FIG. 15 with a plurality of anchor members having a U-shaped cross-section.
Figure 20:
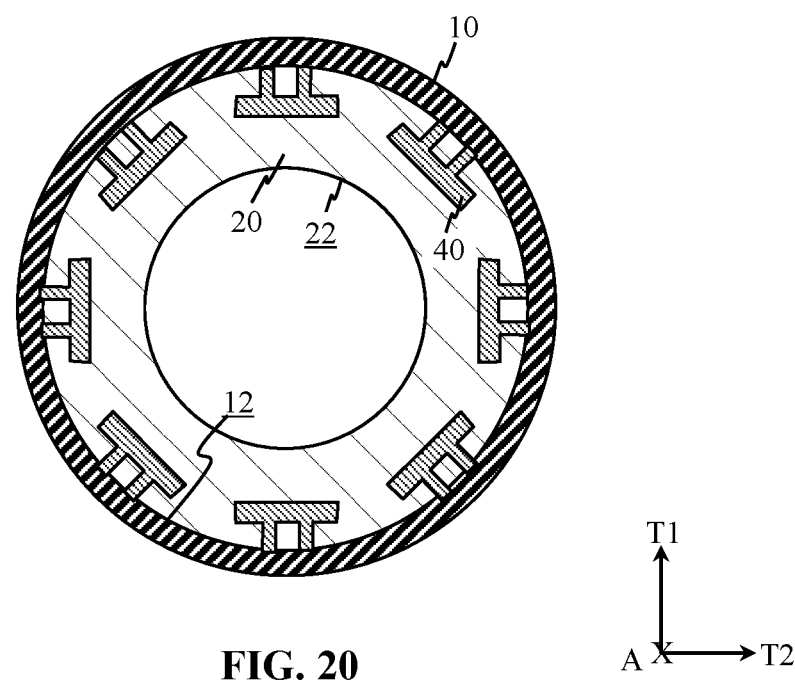
FIG. 20 is a transverse cross-sectional view of a variant of the pipe assembly of FIG. 15 with a plurality of anchor members having a 7c-shaped cross-section.

The present invention is not limited by any particular shape of the bars forming the anchor members (40). As non-limiting examples, FIGS. 18 to 20 show further variations of the anchor member (40), which are differentiated by their shape. The bars may have a cylindrical or rectangular prismatic shape defining an aperture (42) (FIG. 18), U-shaped cross-section (FIG. 19), or a-shaped cross-section (FIG. 20). For example, the anchor member (40) may have three prongs, four prongs, or six prongs, which may be arranged to effect T-shaped or Y-shaped cross-sectional shapes. In the embodiment of FIG. 18, the aperture (42) has an elliptical (circular) cross-sectional shape. In other embodiments, the aperture (42) may have another cross-sectional shape, such triangular, or quadrilateral (trapezoidal). In embodiment, the cross-sectional shape of the aperture (42) may narrow in the transverse direction from the inner wall of the pipe shell toward the central axis of the pipe assembly, in a manner analogous to the apertures (42) of the embodiments shown in FIGS. 6 and 7. In other embodiments (not shown), the anchor member (40) may be one or more bars defining one or more prongs or protrusions.

Use of anchor members (40) having complex shapes may enhance the efficacy of the anchor member (40) in preventing delamination of the liner (20) from the inner wall (12) of the pipe shell (10). This may be by increasing the available bonded surface area of the liner (20), and by providing surfaces against which the liner (20) can bear to resist separation of the liner (20) from the pipe shell (10).

Use of anchors members (40) having shapes that allow for multiple points of attachment to the inner wall (12) of the pipe shell (20), such as U-shaped anchor members (FIG. 19), or π-shaped anchor members (FIG. 20) may be advantageous for better securing the anchor members (40) to the pipe shell (10).

Figure 21:
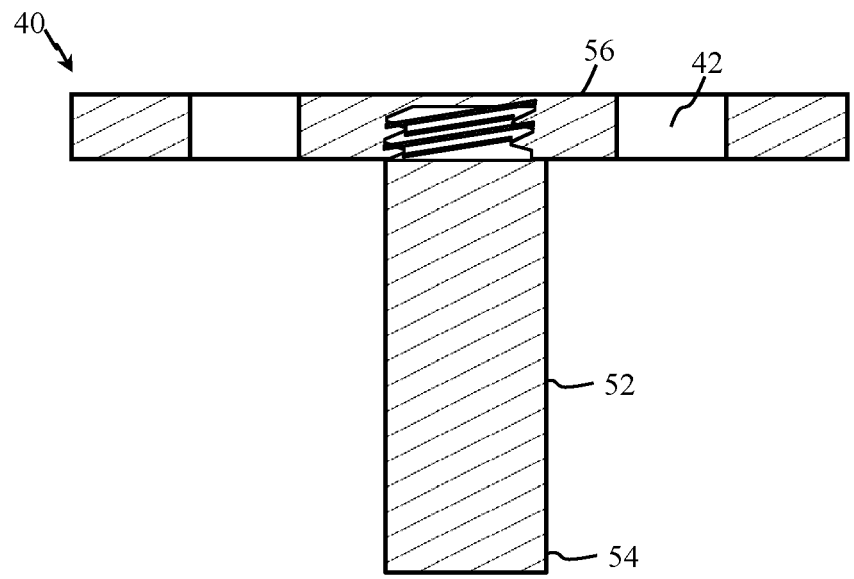
FIG. 21 is a side view of a first embodiment of an anchor member of the present invention in the form of a bar and an attached cap, with a cross-section along line 1-1 of FIG. 22.
Figure 22:
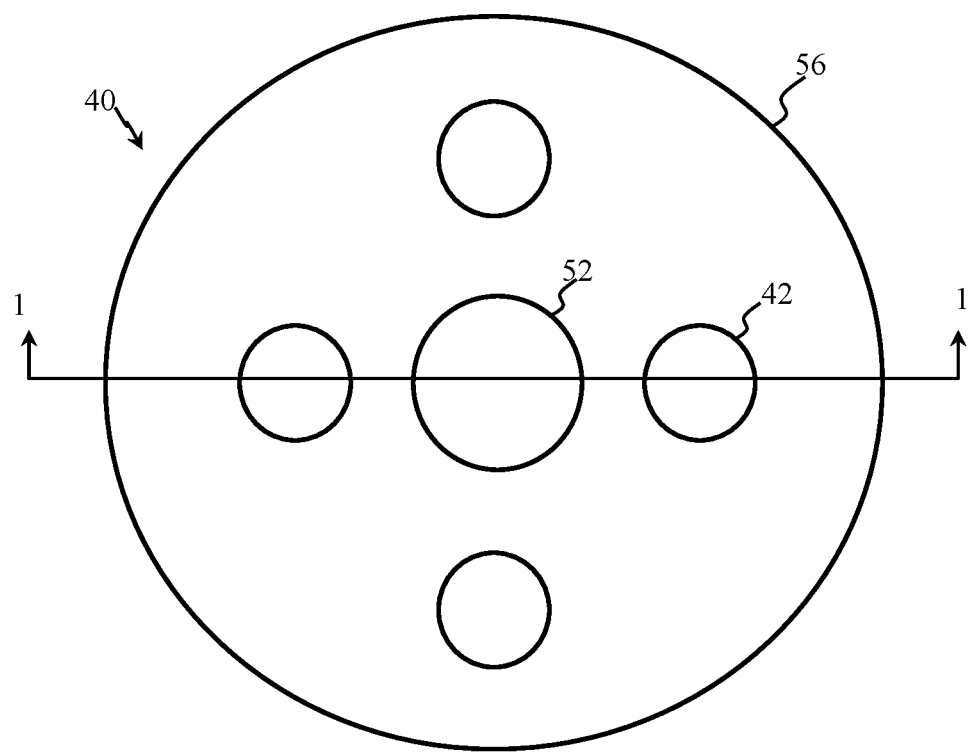
FIG. 22 is a bottom view of the anchor member of FIG. 21.

FIG. 21 (side view) and FIG. 22 (bottom view) show an embodiment of the anchor member (40), which may be used in like manner as the anchor members (40) shown in FIGS. 15 to 20. The anchor member is the form of a bar (52) and an attached cap (56). The bar (52) ends from a first end (54) for attachment to the pipe shell (10) to a second end attached to the cap (56). In this embodiment, the cap (56) has one or more cap members that extend outwardly from the bar (52) in multiple directions.

In the embodiment shown in FIGS. 21 and 22, the bar (52) and the cap (56) are formed separately from each other, and removably attached to each other. The second end of the bar (52) defines a male threaded end, while the cap (56) defines a complementary female threaded receptacle for connection of the bar (52) and the cap (56). Removable attachment of the bar (52) and the cap (56) may facilitate installation of different types of caps (56) within a pipe assembly having multiple bars (52) attached to the pipe shell (10), or substitution of a different cap (56) in the event of repair or modification of the pipe assembly. In other embodiments, the cap (56) may be formed monolithically as one body with the bar (52), or the cap (56) may be attached to the bar (52) by other means such as a welded connection.

In this embodiment, the cap (56) has the form of a cylindrical plate that extends perpendicularly to the length of the bar (52). To further improve the efficacy of the anchor member (40), the cap (56) may have one or more apertures (42). The apertures (42) are filled by the liner (20), and through which the liner (20) extends in a manner analogous to the apertures (42) described in respect to the embodiment shown in FIGS. 4 to 8, 13, and 14. In this embodiment, the cap (56) has four elliptical (circular) apertures (42) distributed over the cap (46). In other embodiments, the number of apertures (42) may differ, and the apertures (42) can have a variety of other shapes, with non-limiting embodiments being triangular (as shown in FIG. 6), quadrilateral, and more particularly trapezoidal (as shown in FIG. 7), or arcuate (as shown in FIG. 8).

Figure 23:
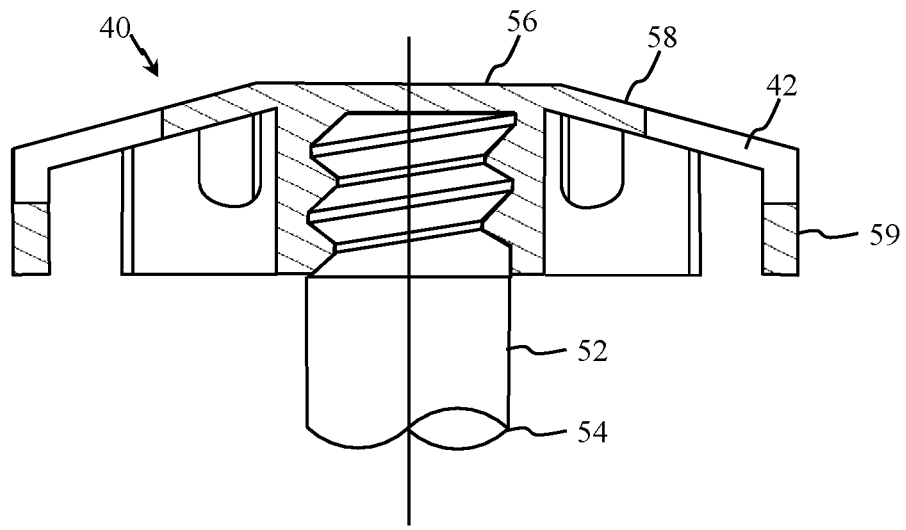
FIG. 23 is a side view of a second embodiment of an anchor member of the present invention in the form of a bar and an attached cap, with a partial cross-section of the cap along line 1-1 of FIG. 24.
Figure 24:
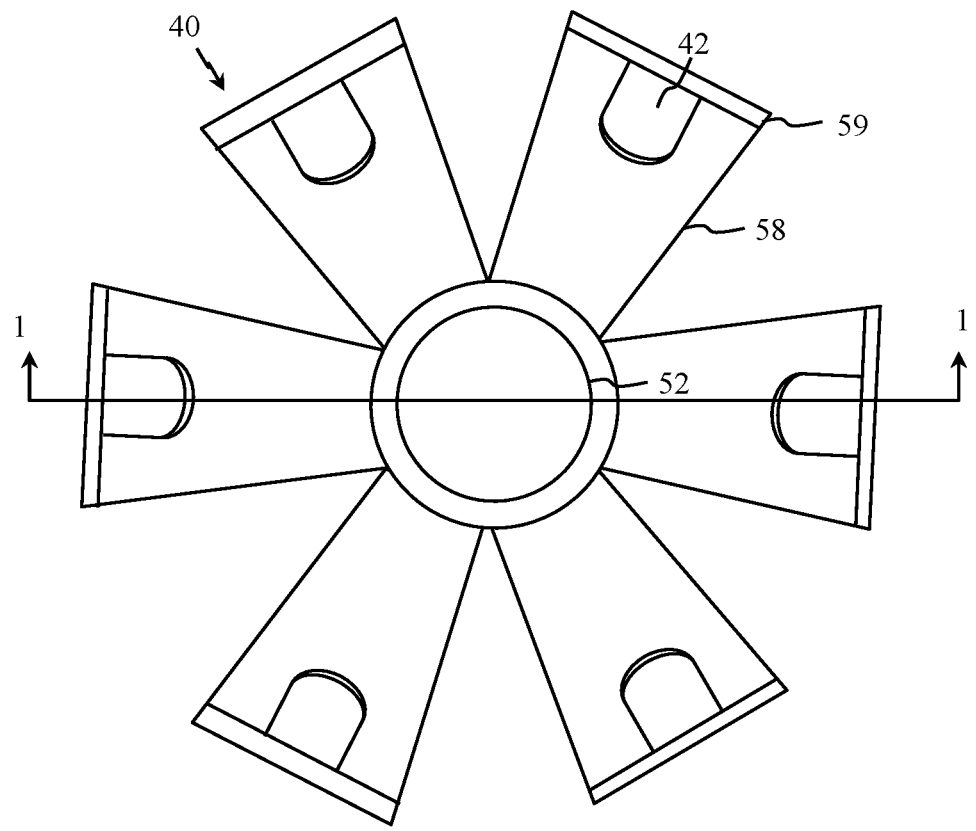
FIG. 24 is a bottom view of the anchor member of FIG. 23.

FIG. 23 (side view) and FIG. 24 (bottom view) show another embodiment of the anchor member (40) in the form of a bar (52) and an attached cap (56), which may be used in like manner as the anchor members (40) shown in FIGS. 15 to 20. In this embodiment, the cap (56) has eight cap members that extend away from the bar (52) in different directions, so as to collectively have an umbrella-like or floral-like form in respect to the bar (52). Each cap member has a first portion (58) that extends away from the bar (52) leading to a second portion (59) that extends parallel to the bar (52). Each of the cap members defines one of the apertures (42) that are filled by the liner (20) and through which the liner (20) extends. In other non-limiting embodiments, the cap (56) may have a different number of cap members that extend away from the bar (52). In other embodiments, the cap members may have a different form, such as plate having planar surfaces that extend parallel to the bar (52).

Seventh Embodiment: Anchor Member with Attached Reinforcing Members

Figure 25:
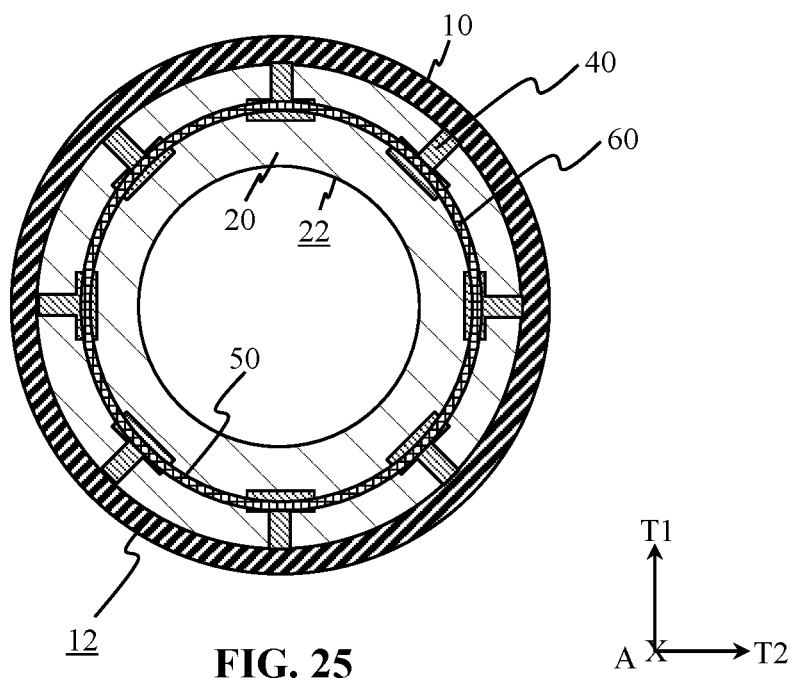
FIG. 25 is a transverse cross-sectional view of a seventh embodiment of a pipe assembly of the present invention, including a plurality of anchor members with reinforcing members in the form of a wire mesh attached to the anchor members, and embedded within the liner.

FIG. 25 shows a pipe assembly that is in all respects the same as the pipe assembly shown in FIGS. 15 and 16, except that the pipe assembly further includes one or more reinforcing members (60) attached to the anchor member (40), spaced apart from the inner wall (12) of the pipe shell (10), and embedded in the liner (20). In this embodiment, the reinforcing members (60) are in the form a wire mesh, which may be made of metal, and which extends both circumferentially, and axially along the pipe assembly. The wire mesh should be selected so that the openings formed by the wire mesh do not impede through flow of uncured liner material flowing through the mesh, and embedding in the apertures of the mesh, during installation of the liner (20). In other embodiments, the reinforcing members (60) may take the form of bars that extend axially along the pipe assembly, or bars formed into hoops that extend circumferentially and are spaced apart axially along the pipe assembly.

The presence of the reinforcing members (60) may enhance the efficacy of the anchor member (40) in preventing delamination of the liner (20) from the inner wall (12) of the pipe shell (10) by increasing the available bonded surface area of the liner (20). The reinforcing members (60) may also reinforce the liner (20). This may resist the formation of cracks or other defects in the liner (20) that would otherwise allow fluid to infiltrate to the bonding interface between the liner (20) and the inner wall (12) of the pipe shell (10). This may also help to resist any delaminated portions of the liner (20) from breaking away from the remainder of the liner (20) and entering the fluid stream.

Combinations of Features.

Features of the embodiments of the anchor members (40) shown in FIGS. 2 through 25 may be combined with each other. For example, embodiments of the anchor members (40) shown in FIGS. 2 to 8, 11 to 20, and 25 may have protrusions (50) shown in FIGS. 9 and 10. Embodiments of the anchor members (40) shown in FIGS. 9 to 12 may define apertures (42) shown in FIGS. 4 to 8. Embodiments of the anchor members (40) shown in FIGS. 2 through 24, may be supplemented with reinforcing members (60) as shown in FIG. 25. Further, a pipe assembly may include a combination of one or more different embodiments of anchor members (40).

Interpretation.

The corresponding structures, materials, acts, and equivalents of all means or steps plus function elements in the claims appended to this specification are intended to include any structure, material, or act for performing the function in combination with other claimed elements as specifically claimed.

References in the specification to "one embodiment", "an embodiment", etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such module, aspect, feature, structure, or characteristic with other embodiments, whether or not explicitly described. In other words, any module, element or feature may be combined with any other element or feature in different embodiments, unless there is an obvious or inherent incompatibility, or it is specifically excluded.

It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition or step being referred to is an optional (not required) feature of the invention.

The singular forms "a," "an," and "the" include the plural reference unless the context clearly dictates otherwise. The term "and/or" means any one of the items, any combination of the items, or all of the items with which this term is associated. The phrase "one or more" is readily understood by one of skill in the art, particularly when read in context of its usage.

The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values and ranges proximate to the recited range that are equivalent in terms of the functionality of the composition, or the embodiment.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc.

As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio.

The claimed invention is:

1. A pipe assembly defining an axial direction parallel to a central axis of the pipe assembly, and a transverse direction perpendicular to the axial direction, the pipe assembly comprising:
   (a) a pipe shell defining an inner wall;
   (b) a liner that lines the inner wall of the pipe shell, and defines an inner wall of the pipe assembly; and
   (c) at least one anchor member that is attached to the pipe shell, extends from the inner wall of the pipe shell, and is embedded within the liner; wherein the at least one anchor member retains the liner against the pipe shell to inhibit slurry flow induced delamination of the liner from the pipe shell.

2. The pipe assembly of claim 1, wherein the at least one anchor member comprises a plurality of anchor members.

3. The pipe assembly of claim 2, wherein the anchor members are spaced apart from each other in the axial direction.

4. The pipe assembly of claim 2, wherein the anchor members are spaced apart circumferentially from each other in a transverse cross-section of the pipe assembly perpendicular to the central axis of the pipe assembly, so as to extend from different portions of the inner wall of the pipe shell in a transverse cross-section of the pipe assembly.

5. The pipe assembly of claim 1, wherein the at least one anchor member defines an aperture filled by the liner, and through which the liner extends.

6. The pipe assembly of claim 5, wherein the aperture has a shape that narrows in width, proceeding in a direction from the inner wall of the pipe shell toward the central axis of the pipe assembly.

7. The pipe assembly of claim 1, wherein the at least one anchor member comprises at least one plate.

8. The pipe assembly of claim 7, wherein the at least one plate has an annular shape in a transverse cross-section of the pipe assembly perpendicular to the central axis of the pipe assembly, forming an annular plate.

9. The pipe assembly of claim 7, wherein the at least one plate comprises multiple plates spaced apart circumferentially from each other in a transverse cross-section of the pipe assembly perpendicular to a central axis of the pipe assembly, so as to extend from different portions of the inner wall of the pipe shell in a transverse cross-section of the pipe assembly.

10. The pipe assembly of claim 9, wherein the at least one anchor member further comprises at least one protrusion extending axially from the at least one plate.

11. The pipe assembly of claim 10, wherein the at least one plate and the at least one protrusion collectively form a T-shape in an axial cross-section of the pipe assembly.

12. The pipe assembly of claim 10, wherein the at least one plate and the at least one protrusion collectively form a Y-shape in an axial cross-section of the pipe assembly.

13. The pipe assembly of claim 1, wherein the at least one anchor member comprises a plurality of anchor members, and wherein each anchor member comprises at least one bar.

14. The pipe assembly of claim 13, wherein each bar has a T-shaped cross-section or a Y-shaped cross-section.

15. The pipe assembly of claim 13, wherein each bar has a 7C-shaped cross-section.

16. The pipe assembly of claim 13, wherein each bar has more than one point of attachment to the pipe shell.

17. The pipe assembly of claim 13, wherein the at least one anchor member further comprises a cap attached to each bar, and extending away from the corresponding bar in multiple directions.

18. The pipe assembly of claim 17, wherein the cap is removably attached to the corresponding bar.

19. The pipe assembly of claim 18, wherein the cap is removably attached to the corresponding bar by a threaded connection.

20. The pipe assembly of claim 1, further comprising at least one reinforcing member attached to the at least one anchor member, spaced apart from the inner wall of the pipe shell, and embedded in the liner.

21. The pipe assembly of claim 20, wherein the at least one reinforcing member comprises a wire mesh.

22. A method of forming a pipe assembly, the method comprising the steps of:
(a) providing at least one anchor member attached to and extending from an inner wall of a pipe shell; and
(b) applying a liner material to the inner wall of the pipe shell to form a liner that lines the inner wall of the pipe shell, and defines an inner wall of the pipe assembly, with the at least one anchor member embedded within the liner;
wherein the at least one anchor member is attached to the inner wall of the pipe shell and is embedded within the liner to retain the liner against the pipe shell to inhibit slurry flow induced delamination of the liner from the pipe shell.

23. The method of claim 22, wherein step (a) comprises attaching the at least one anchor member to the inner wall of the pipe shell by welding, a fastener, or an adhesive.

24. The method of claim 22, wherein step (a) comprises forming the at least one anchor member monolithically with the pipe shell by casting.

25. The method of claim 22, wherein step (b) comprises applying the liner material in liquid or malleable form and allowing the liner material to cure in place.

26. The method of claim 25, wherein the at least one anchor member defines an aperture, and the liner material in liquid or malleable form fills the aperture before being allowed to cure in place.

27. The method of claim 22, wherein:
the method further comprises, before step (b), providing at least one reinforcing member attached to the at least one anchor member, spaced apart from the inner wall of the pipe shell; and
after step (b) the at least one reinforcing member is embedded in the liner.

28. The method of claim 27, wherein the at least one reinforcing member comprises a wire mesh.

29. The pipe assembly of claim 5, wherein each of the apertures narrows in width, proceeding in a direction from the inner wall of the pipe shell toward the central axis of the pipe assembly.

30. The pipe assembly of claim 8, wherein the at least one annular plate further comprises at least one protrusion extending axially therefrom.

31. The pipe assembly of claim 30, wherein the at least one protrusion is configured such that the at least one annular plate has a T-shaped or a Y-shaped axial cross-section.

32. The pipe assembly of claim 8, wherein the at least one annular plate comprises multiple annular plates axially spaced apart from each other along the pipe assembly, the multiple annular plates being interconnected only via the liner and the pipe shell.

33. The pipe assembly of claim 20, wherein each of the at least one reinforcing member extends both circumferentially and axially along the pipe assembly.

34. The pipe assembly of claim 20, wherein each of the at least one reinforcing member comprises a bar that has a hoop shape and extends circumferentially and wherein the at least one reinforcing members are spaced apart from each other along the pipe assembly.

35. The pipe assembly of claim 20, wherein the at least one reinforcing member, the at least one anchor member and the inner wall of the pipe shell define apertures filled by the liner and through which the liner extends.

36. The pipe assembly of claim 1, wherein at least one aperture is defined between a surface of the at least one anchor member and a portion of the inner wall of the pipe shell, wherein the at least one aperture is filled by the liner and the liner extends therethrough.

37. The pipe assembly of claim 1, wherein the pipe assembly is configured as an inlet pipe assembly, an outlet pipe assembly, a flange pipe assembly, a tee pipe assembly, an elbow pipe assembly or a pipe spool; and wherein the liner is composed of cured polyurethane or cured rubber sheets.

38. The pipe assembly of claim 16, wherein each bar has a U-shaped cross-section.

* * * * *